(12) United States Patent
Higuchi

(10) Patent No.: US 7,589,922 B2
(45) Date of Patent: Sep. 15, 2009

(54) LENS DRIVING APPARATUS AND ITS MANUFACTURING METHOD

(75) Inventor: Daisuke Higuchi, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 11/936,833

(22) Filed: Nov. 8, 2007

(65) Prior Publication Data

US 2008/0117536 A1 May 22, 2008

(30) Foreign Application Priority Data

Nov. 8, 2006   (JP) .............................. 2006-303177

(51) Int. Cl.
*G02B 7/02* (2006.01)
(52) U.S. Cl. ...................................... 359/824; 359/822
(58) Field of Classification Search ......... 359/694–700, 359/819–824
See application file for complete search history.

(56) References Cited

U.S. PATENT DOCUMENTS 4,479,051 A * 10/1984 Musha ....................... 250/202

FOREIGN PATENT DOCUMENTS

JP   2005-128392 A   5/2005
JP   2006-201525 A   8/2006

* cited by examiner

*Primary Examiner*—Mohammed Hasan
(74) *Attorney, Agent, or Firm*—Cantor Colburn LLP

(57) ABSTRACT

A lens driving apparatus and method may include a movable body holding lenses; a fixed body for supporting the movable body via a spring member to move in the optical axis direction; and a magnetic drive mechanism which has coils held by the movable body and which drives said movable body in the optical axis direction. Additionally, the spring member may be configured with a plurality of spring pieces which are electrically divided at one location in the optical axis direction, and a plurality of coil end portions pulled out from the coils are respectively and electrically connected to different spring pieces of a plurality of spring pieces from each other.

12 Claims, 12 Drawing Sheets

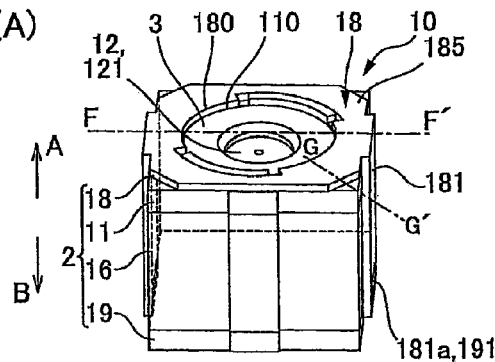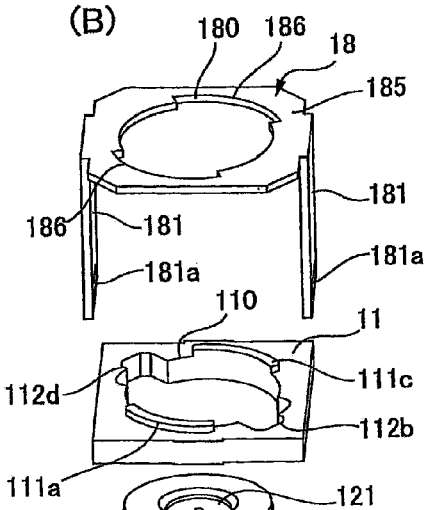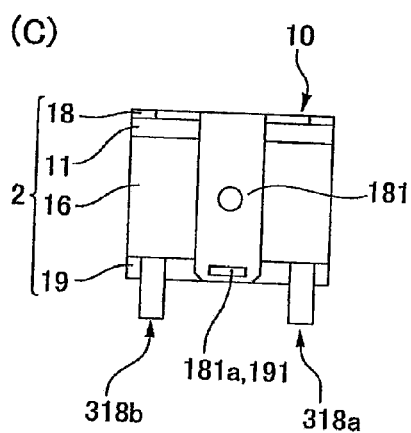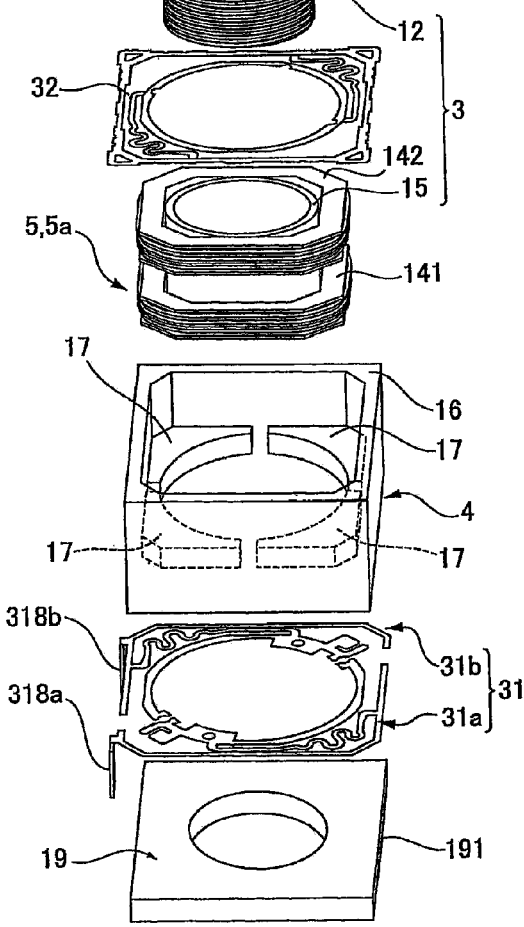

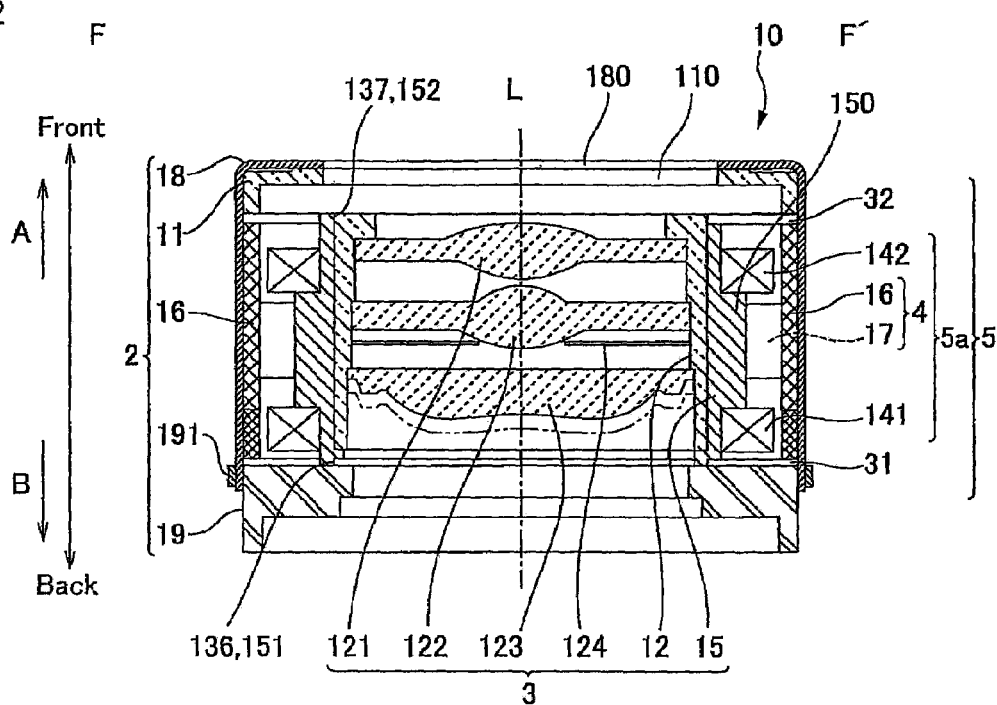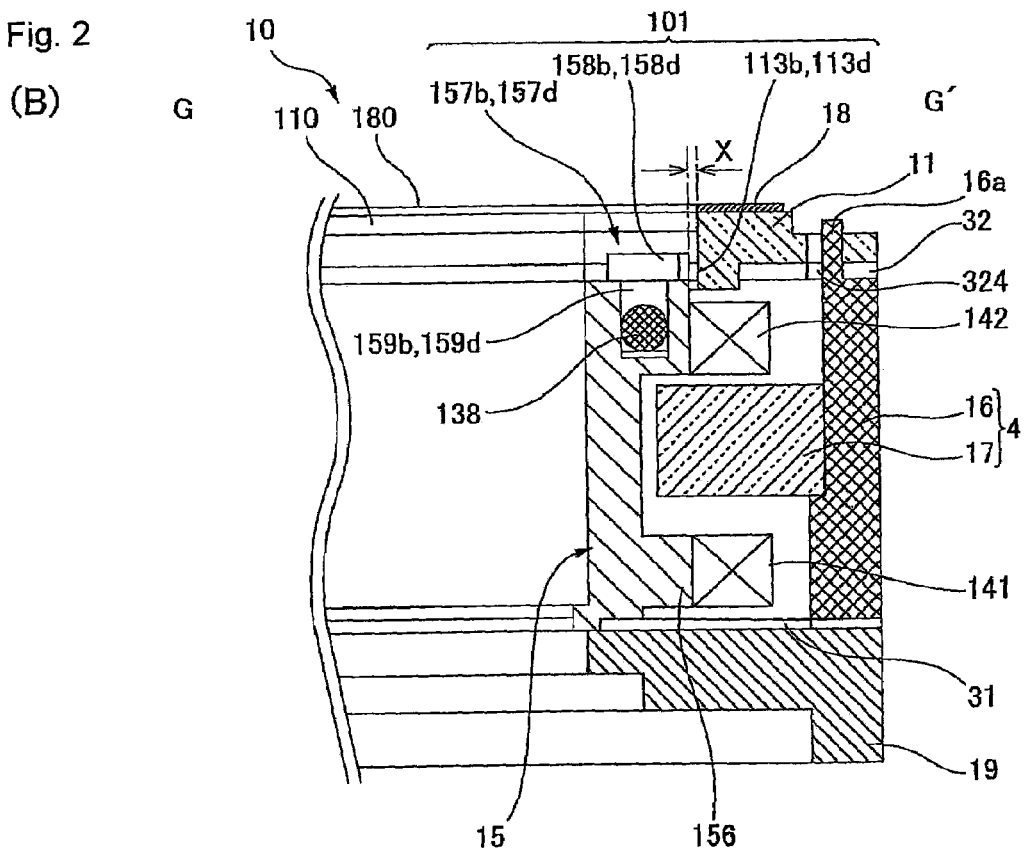

(A)

(B)

(A)

(B)

LENS DRIVING APPARATUS AND ITS MANUFACTURING METHOD

The present application claims priority under 35 U.S.C. §119 to Japanese application 2006-303177 filed on Nov. 8, 2006, the contents of which are incorporated herein by reference.

FIELD OF INVENTION

The present invention relates to the field of a lens driving apparatus that drives lenses in the optical axis direction to image a photographic subject and related manufacturing methods.

BACKGROUND

Camera phones having a camera function and digital cameras have been widely available in recent years, and cameras installed in such mobile apparatuses have a lens driving apparatus for driving lenses to move in the optical axis direction. One such lens driving apparatus has been proposed that has a movable body holding lenses, a fixed body for supporting the movable body via two flat springs to move in the optical axis direction, the two flat springs being positioned at two places distanced in the optical axis direction, and a magnetic drive mechanism for driving the movable body in the optical axis direction. Another configuration has also been proposed in which two coil end portions pulled out from the coils are respectively connected to the two flat springs so that current is supplied to the coils via the two flat springs (see Patent References 1 and 2).

[Patent Reference 1] Japanese Unexamined Patent Application (Tokkai) NO. 2005-128392

[Patent Reference 2] Japanese Unexamined Patent Application (Tokkai) NO. 2006-201525

However, in the lens driving apparatus disclosed in the above-mentioned patent references, it is necessary to supply electricity to the two flat springs that are distanced from each other in the optical axis direction; therefore, the apparatus is configured such that terminals are positioned at two places which are distanced from each other in the optical axis direction or one of the terminals is pulled around to the vicinity of the other terminal. In the former case, the wiring pattern becomes more complicated on the substrate for current supply to the terminals; in the latter case, in a downsized lens driving apparatus, enough space cannot be obtained for pulling the terminals around.

Considering the above problems, an objective of the present invention is to provide a lens driving apparatus in which current can be easily supplied to the coils provided to the movable body, and to provide its manufacturing method.

SUMMARY

To achieve the above, an embodiment of the present invention may feature a lens driving apparatus that comprises a movable body holding lenses, a fixed body for supporting the movable body via a spring member to move in the optical axis direction, and a magnetic drive mechanism which has coils held by the movable body and drives the movable body in the optical axis direction; wherein the spring member is configured with a plurality of spring pieces which are electrically divided at one place in the optical axis direction, and a plurality of coil end portions pulled out from the coils are respectively and electrically connected to different spring pieces of a plurality of spring pieces from each other.

In at least an embodiment of the present invention, the spring member may be divided into a plurality of spring pieces at one place in the optical direction and these spring pieces are used for current supply; therefore, current can be supplied at only one place in the optical axis direction to supply current to the coils. Therefore, there is no need to supply current at two places which are distanced from each other in the optical axis direction and no need to pull around one of the terminals to the vicinity of the other terminal in the optical axis direction. Thus, current can be easily supplied to the coils arranged to the movable body.

In at least an embodiment of the present invention, the spring member may be configured with a first spring member and a second spring member positioned at two places which are distanced from each other in the optical axis direction, and either the first spring member or the second spring member is divided into a plurality of spring pieces.

In this case, it is preferred that the other spring member, the first spring member or the second spring member [which is not divided], have openings formed for the coil end portions pulled out from the coils to pass at the positions away from the spring piece.

In at least an embodiment of the present invention, it is preferred that the second spring member be arranged on the photographic subject side and the first spring member be arranged on the side opposite from the photographic subject side, and the first spring member be divided into a plurality of spring pieces. Other electrical wiring such as the arrangement of an image pick-up device needs to be done on the side opposite from the photographic subject side; therefore, by gathering the wiring locations on the side opposite from the photographic subject side, wiring space can be reduced, increasing efficiency in wiring.

In at least an embodiment of the present invention, it is preferred that the first spring member and the second spring member be composed of different materials. In this way, the spring member that is divided into the spring pieces can be formed of a material that can be easily bent and cut off by folding, machine cutting or laser fusing while the spring member that will not be divided can be composed of a material that enhances the spring property.

In at least an embodiment of the present invention, it is preferred that a terminal for external power supply be formed integrally with the spring piece. In this way, there is no need to provide an additional terminal.

In at least an embodiment of the present invention, it is preferred that, one of the coil end portions pulled out from the coils, which is pulled out at the position away from the spring piece is passed through a groove-like guide portion extending in the optical axis direction on the outer peripheral face of the movable body and pulled around to the spring piece. In this way, there is no need to obtain additional space for pulling around the coil end portion.

In at least an embodiment of the present invention, the coil is configured with the first coil and second coil positioned at two places distanced from each other in the optical axis direction, and the first coil and the second coil are connected with each other by coil end portions thereof on one ends and coil end portions on the other ends are electrically connected to the spring pieces.

In at least an embodiment of the present invention, a configuration may be used in which the connection portion of the coil end portions on one ends are electrically connected to the spring piece which is different from the one connected to the coil end portions on the other ends.

In at least an embodiment of the present invention, a configuration may be used in which a plurality of spring pieces include a spring piece that is electrically connected to a back yoke constituting the magnetic drive mechanism, and a ground potential is applied to the spring piece. In this way, a shield structure using the back yoke can be easily configured.

In at least an embodiment of the present invention, it is preferred that the ends of a plurality of spring pieces have a cutting trace.

At least an embodiment of the present invention features a method of manufacturing a lens driving apparatus that comprises a movable body holding lenses, a fixed body for supporting the movable body via a spring member to move in the optical axis direction, and a magnetic drive mechanism which is provided with coils held by the movable body and drives the movable body in the optical axis direction, wherein a spring member configuring unit as a single unit is connected with the movable body first, the spring member configuring unit is divided into spring pieces to which a plurality of coil end portions pulled out from the coils are respectively connected, and the spring member is configured by a plurality of spring pieces. In this way, even when the spring member is configured by a plurality of spring pieces, the spring member configuring unit as a single unit simply needs to be connected to the movable body; therefore, there is no need to connect a plurality of spring pieces separately to the movable body. Accordingly, the efficiency in assembling a lens driving apparatus can be improved.

In at least an embodiment of the present invention, it is preferred that the spring member configuring unit be configured such that a plurality of spring pieces are joined together via constricted portions or thin portions. In this ways, the spring member configuring unit can be divided by an easy method of folding at the constricted portions or at the thin portions to configure a plurality of spring pieces.

In at least an embodiment of the present invention, the spring member is divided into a plurality of spring pieces at one place in the optical axis direction, through which current is supplied to the coils; thus, the coils can be supplied with current at only one location in the optical axis direction. Therefore, there is no need to supply current at two locations distanced in the optical axis direction, and also there is no need to pull around one terminal to the vicinity of the other terminal in the optical axis direction; thus, current can be easily supplied to the coils arranged to the movable body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1(A), (B) and (C) are respectively an external appearance view of a lens driving apparatus to which the present invention may be applied, observing the front of the apparatus diagonally from the top, its perspective disassembly view and its side view.

FIGS. 2(A) and (B) are respectively cross-sectional views of the lens driving apparatus cut along the optical axis direction at the positions corresponding to the F-F' line and the G-G' line in FIG. 1(A).

DETAILED DESCRIPTION OF THE PREFERRED EMBODIMENTS

Figure 3:
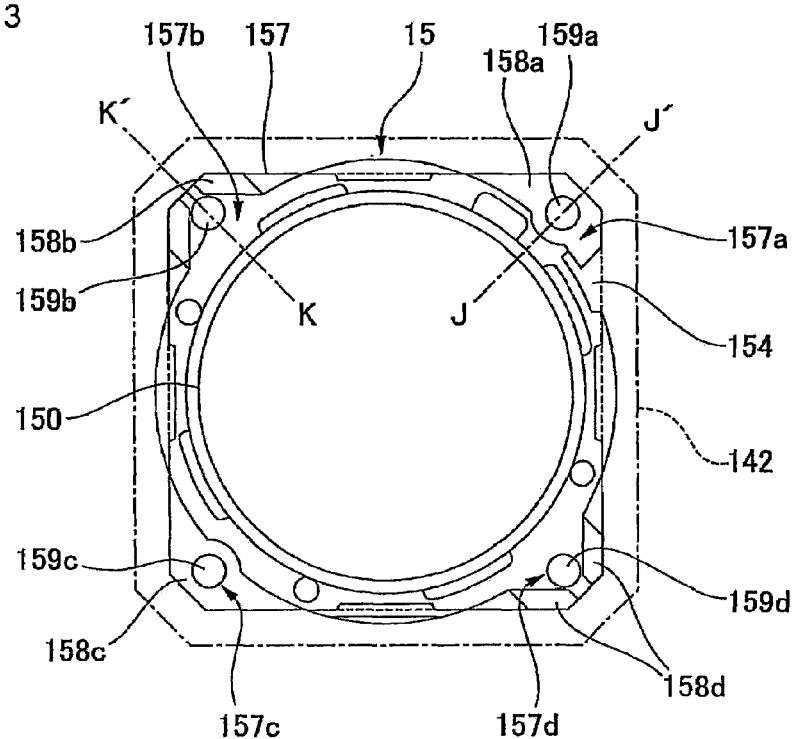
FIGS. 3(A), (B) and (C) are respectively a plan view of the sleeve used in the lens driving apparatus of the present invention, its J-J' cross-sectional view and its K-K' cross-sectional view.
Figure 3:
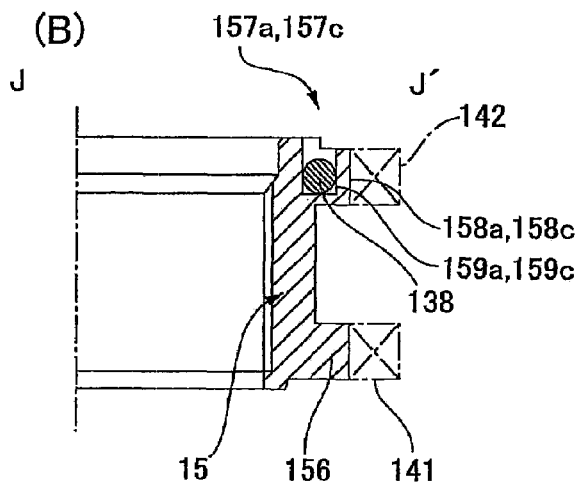
Figure 3:
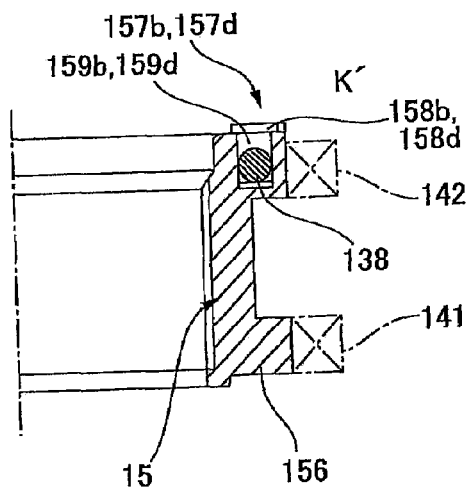

A lens driving apparatus to which the present invention may be applied is described hereinafter referring to the drawings. Note that the lens driving apparatus to be described hereinafter can be installed not only in camera phones, but also in various electronic apparatuses. For example, it can be used in thin digital cameras, PHSs, PDAs, barcode readers, surveillance cameras, cameras for checking behind vehicles, or doors having an optical verification function.

(Overall Configuration)

FIGS. 1(A), (B) and (C) are respectively an external appearance view of a lens driving apparatus to which the present invention may be applied, observing the front of the apparatus diagonally from the top, its perspective disassembly view and its side view. FIGS. 2(A) and (B) are respectively cross-sectional views of the lens driving apparatus, cut along the optical axis direction at the positions corresponding to the F-F' line and G-G' line in FIG. 1(A). Note that the illustrations of the lenses and lens base are omitted in FIG. 2(B).

Used in thin cameras such as digital cameras or camera phones, the lens driving apparatus 1 of this embodiment shown in FIGS. 1(A), (B) and (C) and FIGS. 2(A) and (B) moves three lenses 121, 122, 123 in both A direction (to the front) and B direction (to the back) along the optical axis, the A direction in which the lenses are moved toward a photographic subject (toward an object) and the B direction in which the lenses are moved in the opposite direction from the photographic subject (toward the image). It is in a rectangular parallelepiped shape. The lens driving apparatus 10 has a movable body 3 in which the three lenses 121, 122, 123 and a fixed aperture 124 are held on a cylindrical lens holder 12 as a single unit, a drive mechanism 5 that moves the movable body 3 along the lens optical axis, L, and a fixed body 2 in which the drive mechanism 5 and the movable body 3 are installed. Also, the movable body 3 is provided with a cylindrical sleeve 13 inside which the cylindrical lens holder 12 is fixed.

In this embodiment, the fixed body 2 is provided with a rectangular base 19 for holding an image pick-up device (not illustrated) on the image side, a rectangular case 11 positioned on the photographic subject side, and a plate-like cover 18 (cover portion) for covering the end of the case 11 on the photographic subject side; circular light-entrance windows 110 and 180 are respectively formed in the centers of the case 11 and the plate-like cover 18 for collecting the light reflected from the photographic subject into the lenses. The fixed body 2 is also provided with an angular barrel-shaped back yoke 16 sandwiched between the base 19 and the case 11; the back yoke 16 together with magnets 17, which will be described later, configure an interlinked magnetic field producing body 4 that produces an interlinked magnetic field to coils 141 and 142.

The lens drive mechanism 5 is provided with polygonal barrel-shaped first drive coil 141 and second drive coil 142 arranged on the outer circumferential face of the sleeve 15 and also with the interlinked magnetic field producing body 4 that produces an interlinked magnetic field to the drive coils 141 and 142; the drive coils 141 and 142 and the interlinked magnetic field producing body 4 together configure a magnetic drive mechanism 5a. The interlinked magnetic field producing body 4 is equipped with four magnets 17 arranged between the drive coils 141 and 142 and with the angular barrel-shaped back yoke 16 composed of a ferromagnetic plate such as steel plate; the four drive magnets 17 are respectively fixed in the four corner portions of the inner peripheral face of the back yoke 16. Each of the four drive magnets 17 is magnetized to opposite poles on the inside face and on the outside face. For example, each of the four drive magnets 17 is magnetized to N pole on the inside face and to S pole on the outside face.

The back yoke 16 is sandwiched between the base 19 and the case 11, and is exposed to and configures the side faces of the lens driving apparatus 1.

The lens drive mechanism 5 is further equipped with a first flat spring 31 (spring member) sandwiched between the back yoke 16 and the base 19 and a second flat spring 32 (spring member) sandwiched between the back yoke 16 and the case 11. Both the first flat spring 31 and the second flat spring 32 are formed of a metallic thin plate and the thickness thereof is the same, thus increasing productivity. Note that the thickness of the first flat spring 31 and the second flat spring 32 in the optical axis direction may be varied accordingly. Also, another configuration can be adopted wherein the first flat spring 31 and the second flat spring 32 are composed of different materials, but in the same thickness.

In this embodiment, the distance between the opposing faces of the drive coils 141 and 142 is larger than the dimension of the drive magnet 17 in the optical axis direction, L. Therefore, there is a gap between the drive magnets 17 and the first drive coil 141 and between the drive magnets 17 and the second drive coil 142 in the optical axis direction, L; within the gap, the movable body 3 is movable in the optical axis direction, L.

The back yoke 16 is formed such that the length thereof in the optical axis direction, L, is longer than the distance between the opposing faces of the drive coils 141 and 142. Therefore, leakage of magnetic flux from the magnetic path configured between the drive magnets 17 and the first drive coil 141 and from the magnetic path configured between the drive magnets 17 and the second drive coil 142, can be reduced so that linearity between the moving amount of the sleeve 15 and the current passing through the drive coils 141 and 142 can be improved. For this reason, the above mentioned effect of reducing the leakage of magnetic flux can be obtained in the back yoke 16 of this embodiment even when the yoke 16 is not shaped to cover the side faces and the bottom face or the top face of the drive coils 141 and 142.

In the lens driving apparatus 10, terminals 318a and 318b for the drive coils 141 and 142 are formed on one side face; the configuration of the terminals 318a and 318b will be described later together with the configuration of the first flat spring 31 and the second flat spring 32.

(Detailed Configuration of Sleeve 15)

FIGS. 3(A), (B) and (C) are respectively a plan view of the sleeve 15, its J-J' cross-sectional view and its K-K' cross-sectional view. As shown FIG. 1(B), FIG. 2(A) and FIG. 3(B), the sleeve 15 is cylindrical and a larger diameter portion 150 is formed on the outer circumferential face of the sleeve 15 around the center in the optical axis direction, L. As shown in FIG. 2(B), FIGS. 3(B) and (C), at the end portion of the sleeve 15 on the image pick-up device side, a rectangular flange portion 156 is formed and corner portions are formed at four locations in the circumferential direction. Further, as shown in FIG. 2(B), FIGS. 3(A), (B) and (C), at the end portion of the sleeve 15 on the photographic subject side, a rectangular flange portion 157 is formed and corner portions 157a, 157b, 157c and 157d formed in a trapezoid shape project at the four locations in the circumferential direction.

In this embodiment, when the drive coils 141 and 142 are fixed to the sleeve 15, as shown in FIGS. 2(A), (B) and FIGS. 3(A), (B) and (C), the second drive coil 142 wound around a square drive coil bobbin (not illustrated) is fixed to the outer peripheral face of the flange portion 157 such that the corner portions thereof are positioned outside the corner portions 157a, 157b, 157c and 157d. At that time, the end face of the second drive coil 142 on the image pick-up device side makes contact with the end face of the larger diameter portion 150 on the photographic subject side. Also, the first drive coil 141 wound around a square drive coil bobbin (not illustrated) is fixed to the outer peripheral face of the flange portion 156 such that the corner portions thereof are positioned outside the corner portions of the flange portion 156. At that time, the end face of the first drive coil 141 on the photographic subject side makes contact with the end face of the larger diameter portion 150 on the image pick-up device side.

Of the corner portions 157a, 157b, 157c and 157d in the sleeve 15, the corner portions 157a and 157c that project in a trapezoid shape on the diagonal line are respectively provided with thick portions 158a and 158c on the outer periphery thereof and magnetic piece retaining holes 159a and 159c which open to the photographic subject side are formed inside the thick portions 158a and 158c. In the magnetic piece retaining holes 159a and 159c, magnetic pieces 38 are retained which will be described later.

In the corner portions 157b and 157d which project in a trapezoid shape on the other diagonal line of the sleeve 15, thick portions 158b and 158d are formed projecting toward the photographic subject like columns even more than the end face of the sleeve 15 on the photographic subject side (the end face of the movable body 3 on the photographic subject side), and magnetic piece retaining holes 159b and 159d which open to the photographic subject side are formed inside the thick portions 158b and 158d. In the magnetic piece retaining holes 159b and 159d, magnetic pieces 138 are retained which will be described later.

In this embodiment, the drive coils 141 and 142 are supplied with current via the first flat spring 31 as described in detail later. More specifically, while the drive coil 141 is directly connected to the first flat spring 31, the drive coil 142 is passed through a groove-like guide portion (see FIG. 3(A)) formed in the vicinity of the corner portion 157a of the sleeve 15 and connected to the first flat spring 31. Therefore, there is no need to provide an additional space for pulling around the end portion of the coil. The drive coils 141 and 142 are connected to each other by the coil end portions thereof and the connection portion is stored in the groove-like guide portion 154 of the sleeve 15.

(Configuration of Case 11)

Figure 4:
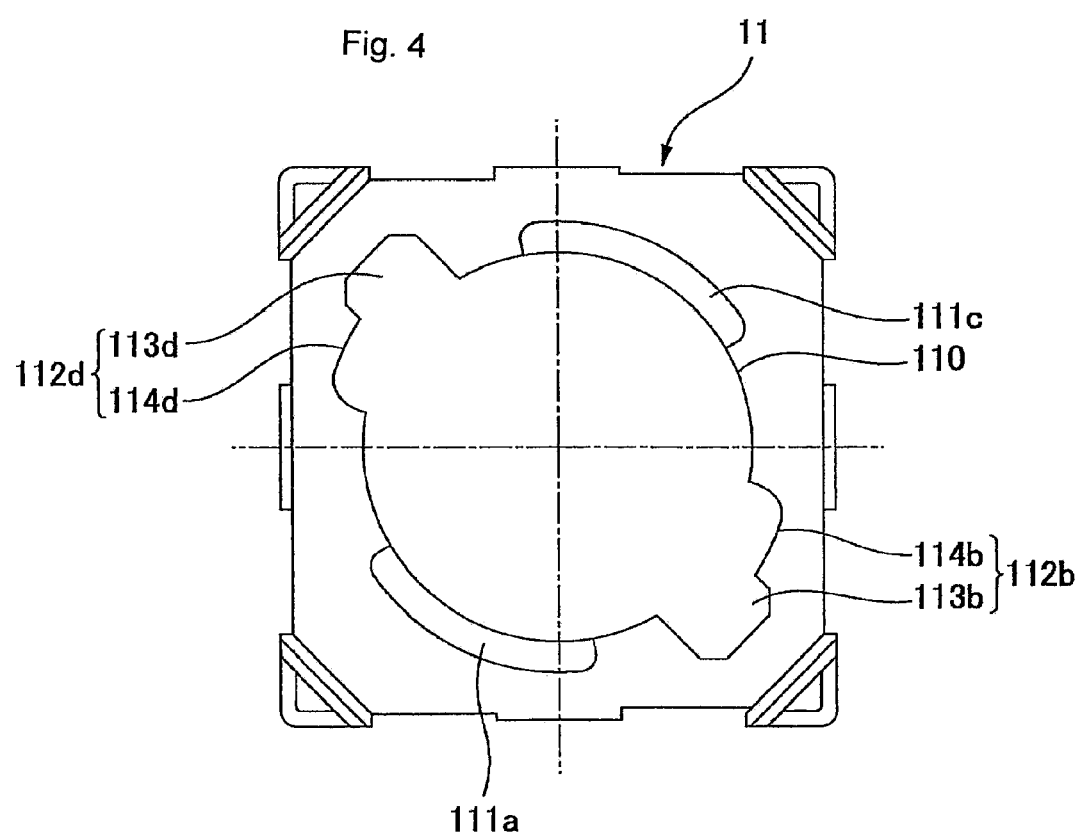
FIG. 4 is a plan view of the case used in the lens driving apparatus to which the present invention is applied.

FIG. 4 is a plan view of the case 11. As shown in FIGS. 1(A) and (B) and FIG. 4, the case 11 is a rectangular flat plate, and a light-entrance window 110 is formed in the center thereof. In the case 11, step portions 111a and 111c are formed along the light-entrance window 110 on one of the diagonal lines.

Also, in the case 11, notches 112b and 112d are cut radially outward from the light-entrance window on the other diagonal line. The notches 112b and 112d are configured by recess portions 113b and 113d and shallow notches 114b and 114d; the recess portions 113b and 113d being cut deep radially outward from the light-entrance window 110 in a trapezoid shape, and the shallow notches 114b and 114d extending in the circumferential direction from the recess portions 113b and 113d. The recess portions 113b and 113d are shaped in trapezoid in the same manner as the corner portions 157b and 157d described referring to FIGS. 3(A) and (C); however, they are slightly larger than the corner portions 157b and 157d.

(Configuration of Plate-Like Cover 18)

Figure 5:
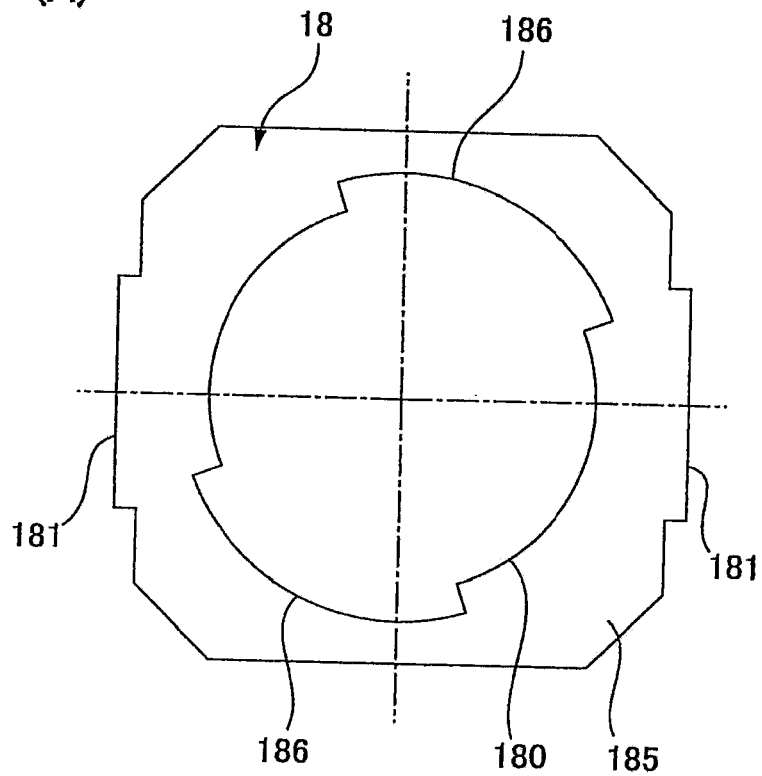
FIGS. 5(A) and (B) are respectively a plan view and a side view of the plate-like cover used in the lens driving apparatus to which the present invention is applied.
Figure 5:
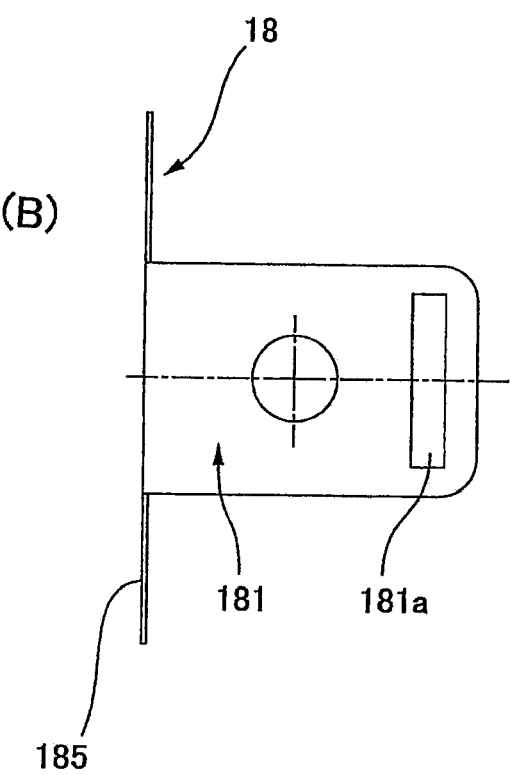

FIGS. 5(A) and (B) are respectively a plan view and a side view of the plate-like cover 18. As shown in FIGS. 1(A) and (B), FIGS. 2(A) and (B) and FIGS. 5(A) and (B), the plate-like cover 18 is composed of a nonmagnetic thin plate (SUS304, for example) and provided with a rectangular ceiling portion 185 that covers the end of the case 11 on the photographic subject side and a pair of engaging leg portions 181 that extend from a pair of opposing sides of the ceiling portion 185. A light-entrance window 180 is formed in the center of the ceiling portion 185 and notches 186 are cut in the positions superposing the step portions 111a and 111c of the case 11 which have been described referring to FIG. 4.

The engaging leg portions 181 have engaging through holes 181a formed near the bottom ends thereof. To engage with these leg portions, engaging protrusions 191 are formed in the side faces of the base 19 as shown in FIGS. 1(A) and (B). Therefore, having the base 19, the flat spring 31, the back yoke 16, the flat spring 32 and the case 11 already layered, the plate-like cover 18 is layered on top of the case 11 on the photographic subject side and the engaging protrusions 191 of the base 19 are fitted into the engaging through holes 181a. In this way, the plate-like cover 18 is fixed to the base 19.

(Configuration of Stopper Mechanism)

Figure 6:
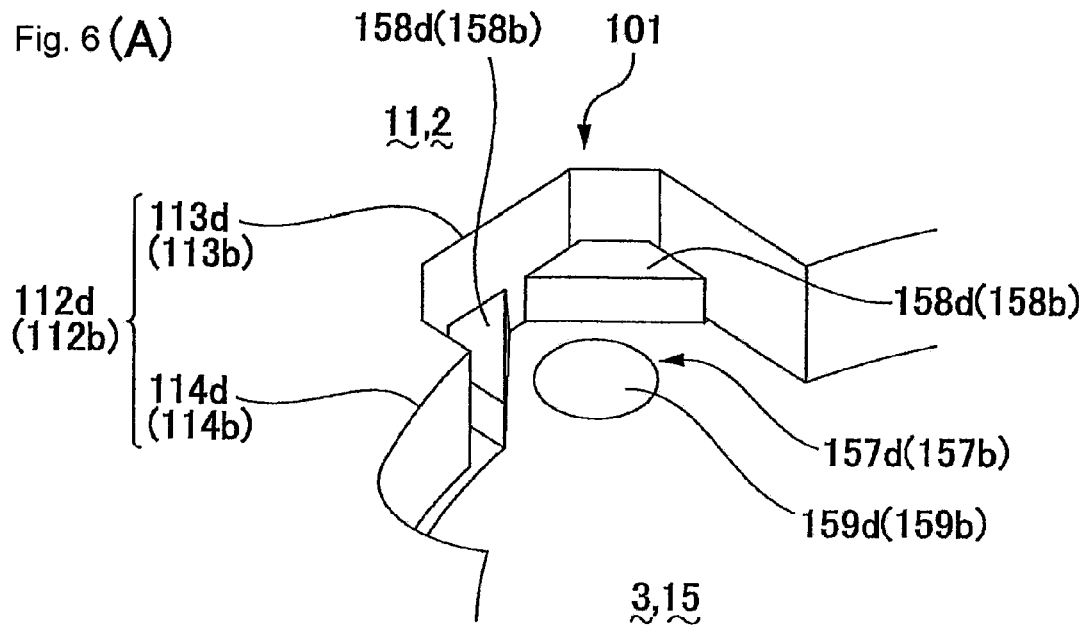
FIGS. 6(A) and (B) are respectively a perspective view of the first stopper mechanism configured in the lens driving apparatus to which the present invention is applied, and its plan view.
Figure 6:
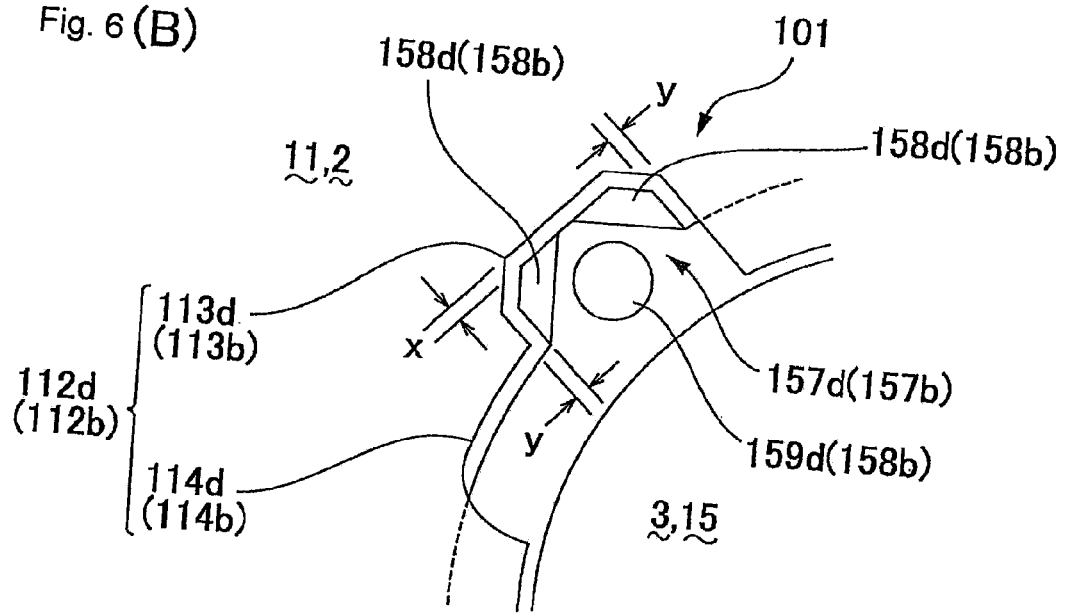

FIGS. 6(A) and (B) are respectively a perspective view of a first stopper mechanism in the lens driving apparatus to which the present invention is applied, and its plan view. When the lens driving apparatus 10 is assembled, as shown in FIGS. 6(A) and (B), the corner portions 157b and 157d of the sleeve 15 (movable body 3) in a plane trapezoid shape settle into the inside of the recess portions 113b and 113d of the case 11 in a plane trapezoid shape. Under this condition, the outer peripheral faces of the corner portions 157b and 157d of the sleeve 15 are opposed to the inner peripheral faces of the recess portions 113b and 113d of the case 11 via a gap, x, on the inner side in the radial direction. Also, the outer peripheral faces of the corner portions 157b and 157d are opposed to the inner peripheral faces of the recess portions 113b and 113d via a gap, y, in the circumferential direction. In this manner, a stopper mechanism 101 is configured for regulating the displacement of the movable body 3 in the direction (radial direction or circumferential direction) perpendicular to the optical axis direction, L.

(Operation)

In the lens driving apparatus 10 of this embodiment, the movable body 3 is normally positioned on the image pick-up device side as shown in FIG. 2(A) or FIG. 2(B). More specifically, the bottom end face (the face on the image side) of the sleeve 15 is in contact with the top face (the face on the front side) of the base 19.

Under such a condition, when current is passed through the drive coils 141 and 142 in a predetermined direction, both coils receive an upward electromagnetic force (toward the front). By this force, the sleeve 15 around which the drive coils 141 and 142 are firmly fixed starts moving toward the photographic subject (toward the front). At that time, resilient force that regulates the movement of the sleeve 15 is respectively applied between the flat spring 31 and the front end of the sleeve 15 and between the flat spring 32 and the rear end of the sleeve 15. For this reason, the sleeve 15 is halted when the electromagnetic force to move the sleeve 15 to the front attains equilibrium with the resilient force that regulates the movement of the sleeve 15. Also, when current is passed through the drive coils 141 and 142 in the opposite direction, the drive coils 141 and 142 receive a downward electromagnetic force (toward the back).

At that time, by adjusting the current passing through the drive coils 141 and 142 and adjusting the resilient force of the flat springs 31 and 32 exerted on the sleeve 15, the sleeve 15 (movable body 3) can be halted in a desired position. Since the urging force of the magnetic pieces 138 and the drive magnets 17 held by the movable body 3 is also used, the magnetic drive mechanism 5a for producing a thrust force in the optical axis direction, L, to the movable body 3 can be downsized.

Also, the flat springs 31 and 32 in this embodiment have a linear relationship established between the resilient force (stress) and the displacement; therefore, linearity between the moving amount of the sleeve 15 and the current passing through the drive coils 141 and 142 can be improved. Also, when the two flat springs 31 and 32 which are resilient members are used, a large force in equilibrium is applied in the optical axis direction, L, when the sleeve 15 is halted; therefore, even when the centrifugal force or another force such as a force of impact is exerted in the optical axis direction, L, the sleeve 15 can be halted with more stability. Further, in the lens driving apparatus 10, the sleeve 15 is halted not by colliding with a colliding material (a buffer material) but by utilizing equilibrium between the electromagnetic force and the resilient force; therefore, colliding noise can be prevented.

Further, in this embodiment, the movable body 3 is supported by the fixed body 2 via the flat springs 31 and 32, and the stopper mechanism 101 is configured between the movable body 2 and the fixed body 2 (case 11) for regulating the displacement of the movable body 3 in the direction (radial direction or circumferential direction) perpendicular to the optical axis direction, L, caused when a shock is applied; therefore, the movable body 3 is not displaced greatly even when a shock is applied to the movable body 3 in the direction perpendicular to the optical axis direction. Therefore, since the flat springs 31 and 32 will not be deformed into unrecoverable shape, they function normally even after a shock is applied. Even when the movable body 2 receives a shock in the direction perpendicular to the optical axis direction, L, the movable body 3 will not be displaced greatly, thus preventing the problems of the drive coils 141 and 142 colliding with other members to cut wires or short circuits. In the lens driving apparatus 10 according to the present invention, shock resistance in the direction perpendicular to the optical axis direction, L, can be improved.

The stopper mechanism 101 is configured by the corner portions 157b and 157d (protrusions) that project from the movable body 3 in the radial direction and the recess portions 113b and 113d inside which the corner portions 157b and 157d are positioned; thus, the stopper mechanism 101 can be constructed by a relatively simple configuration. Also, since the corner portions 157b and 157d and the recess portions 113b and 113d are in a trapezoid (polygonal) shape, even when a shock is applied to the movable body 3 in the direction perpendicular to the optical axis direction, L, the corner portions 157b and 157d and the recess portions 113b and 113d interfere with each other in a relatively wide area, ensuring the operation and preventing any damage to the stopper mechanism 101.

Further, the corner portions 157b and 157d are formed to the movable body 3 while the recess portions 113b and 113d are formed to the fixed body 2 (case 11); therefore, the thickness of the movable body 2 can be reduced. In other words, when the recess portions are formed to the movable body 3, there is a restriction in designing to form the outer peripheral wall of the movable body 3 to be thick. However, since the protrusions (the corner portions 157b and 157d) are formed to the movable body 3, there is no restriction in designing.

Furthermore, the corner portions 157b and 157d are provided with the thick portions 158b and 158d that project like columns from the end face of the movable body 3 on the photographic subject side toward the photographic subject, and the recess portions 113b and 113d are formed to the case 11; therefore, longer dimensions in the optical axis direction, L can be obtained for the protrusions (the corner portions 157b and 157d) and the recess portions 113b and 113d. For this reason, even under the condition where the movable body 3 is in a position shifted to either side in the optical axis direction, L, when a shock is applied to the movable body 3 in the direction perpendicular to the optical axis direction, L, the protrusions (the corner portions 157b and 157d) and the recess portions 113b and 113d will interfere with each other with certainty to regulate the displacement of the movable body 3.

Although the stopper mechanism 101 (the corner portions 157b and 157d and the recess portions 113b and 113d) is exposed to the face of the case 11 on the photographic subject side, since it is covered with the plate-like cover 18, the appearance of the lens driving apparatus 10 can be improved. Also, the plate-like cover 18 prevents foreign matter from entering the lens driving apparatus 10.

Provided to the movable body 3 are the magnetic piece retaining holes 159a, 159b, 159c and 159d for retaining the magnetic pieces 138 that apply the urging force to the movable body 3 in the optical axis direction, L, by using the attraction force produced with the drive magnets 17. While the magnetic piece retaining holes 159a and 159c are covered by the case 11, the other holes 159b and 159d are exposed to the face of the base 11 on the photographic subject side. Therefore, the magnetic piece retaining holes 159b and 159d can be used as the urging force-adjusting magnetic piece retaining portions through which the number and size of the magnetic pieces 138 can be changed even after the case 11 is covered. Even in this case, the magnetic piece retaining holes 159b and 159d (the urging force-adjusting magnetic piece retaining portions) are formed in the corner portions 157b and 157d configuring the stopper mechanism 101 and covered by the plate-like cover 18; thus, foreign matter is prevented from entering the lens driving apparatus 10.

Since the corner portions 157b and 157d (the protrusions) projecting from the movable body 3 in the radial direction are settled inside the recess portions 113b and 113d, the effective length can be obtained for the corner portions 157b and 157d, by which the lens driving apparatus 10 can be thinner.

Note that, although the corner portions 157b and 157d and the recess portions 113b and 113d are respectively formed in a trapezoid (polygonal) shape, they may be formed in a half-circular shape. Also, the bottom ends of the corner portions 157b and 157d may be extended outward in the radial direction and these extended portions be slid to the edges of the recess portions 113b and 113d of the case 11. In this way, the extended portions and the edge of the case 11 are layered in the optical axis direction, L, and opposed to each other via a predetermined gap in the optical axis direction, L. Therefore, the stopper mechanism can be configured for regulating the moving range of the movable body 3 toward the photographic subject when a shock is applied to the movable body 3 in the optical axis direction, L. For this reason, the displacement of the movable body 3 in the optical axis direction, L, can be prevented before the flat springs 31 and 32 are excessively deformed; therefore, the flat springs 31 and 32 can function normally even after the shock is applied. Even when a shock is applied to the movable body 3 in the optical axis direction, L, the movable body 3 will not be displaced excessively; therefore, even in the case that the drive coils 141 and 142 and the drive magnets 17 are opposed to each other in the optical axis direction, L, problems such as cut wires or short circuits that may be caused by the collision between the drive coils 141 and 142 and drive magnets 17 will be prevented. Accordingly, shock resistance in the optical axis direction, L, can be improved in the lens driving apparatus 10.

(Configuration of Current Supply to Drive Coils 141 and 142)

Figure 7:
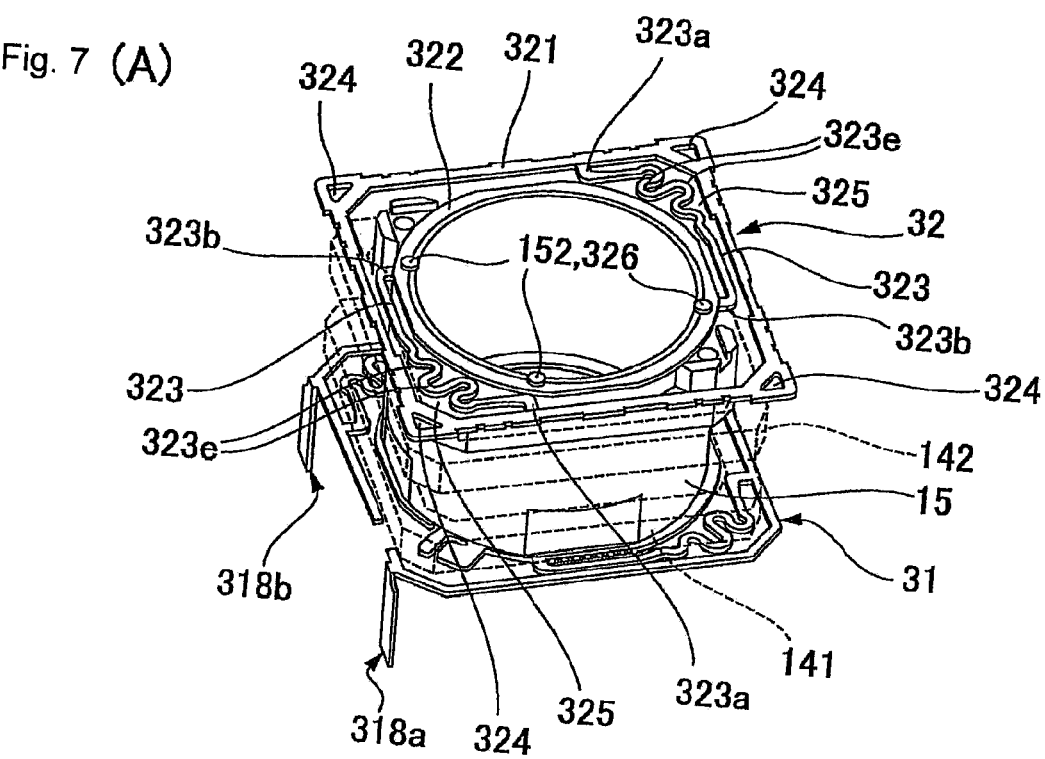
FIGS. 7(A) and (B) are respectively perspective views of the status of the lens driving apparatus of the present invention in which the first flat spring and the second flat spring are joined to the sleeve, observed from the photographic subject side and from the image pick-up side.
Figure 7:
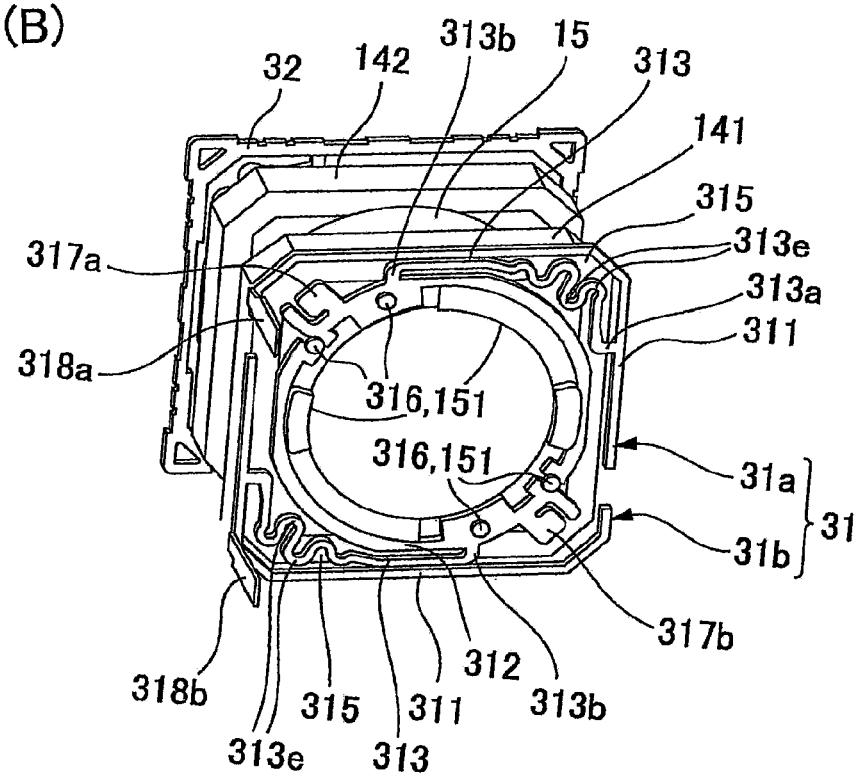
Figure 8A:
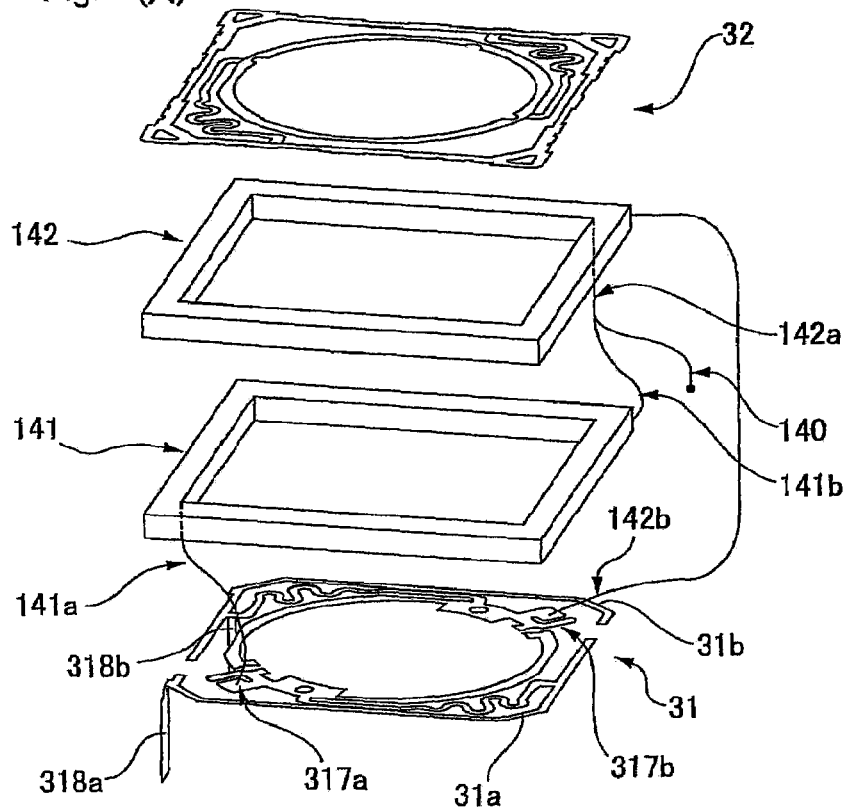
FIGS. 8(A) and (B) are respectively schematic diagrams showing the method of connecting the drive coils to the flat springs to which the present invention is applied.

FIGS. 7(A) and (B) are respectively perspective views of the sleeve 15 with which the flat springs 31 and 32 are joined, observed from the photographic subject side and from the image pick-up device side. FIGS. 8(A) and (B) are respectively schematic diagrams showing methods of joining the drive coils to the flat springs to which the present invention is applied.

As shown in FIGS. 7(A) and (B), in the lens driving apparatus 10 of this embodiment, the first flat spring 31 and the second flat spring 32 are joined to the top and bottom ends of the sleeve 15 (movable body 3). Each of the flat springs 31 and 32 supports the movable body 3 to move in the optical axis direction and functions to prevent the rotation of the movable body 3 about the optical axis.

While the first flat spring 31 and the second flat spring 32 are formed in the same shape, they are arranged at the angle positions mutually shifted by 90°.

In this embodiment, the second flat spring 32 is formed as a single piece. On the other hand, the first flat spring 31 is configured by two spring pieces 31a and 31b which are electrically divided; the terminals 318a and 318b are respectively formed to the spring pieces 31a and 31b. Therefore, as shown in FIGS. 8(A) and (B), the coil ends of the drive coils 141 and 142 are electrically connected to the spring pieces 31a and 31b so that current can be supplied to the drive coils 141 and 142 via the terminals 318a and 318b.

More specifically described, as shown in FIG. 8(A), for example, the beginning winding (coil end portion) 141a pulled out from the inner periphery of the drive coil 141 is soldered to the coil connecting portion 317a formed to the spring piece 31a, and the ending winding (coil end portion) 142b pulled out from the outer periphery of the drive coil 142 is soldered to the coil connecting portion 317b formed to the spring piece 31b. Also, the ending winding (coil end portion) 141b pulled out from the outer periphery of the drive coil 141 is connected with the beginning winding (coil end portion) 142a pulled out from the inner periphery of the drive coil 142. At that time, the ending winding (coil end portion) 142b of the drive coil 142 is passed through the groove-like guide portion 154 cut near the corner portion 157a of the sleeve 15 shown in FIG. 3(A) and guided to the spring piece 31b, and the connection portion 140 between the ending winding (coil end portion) 141b of the drive coil 141 and the beginning winding (coil end portion) 142a of the drive coil 142 is also stored in the groove-like guide portion 154. In this way, the drive coils 141 and 142 are connected in series and the winding directions of the drive coils 141 and 142 are unified.

Figure 8B:
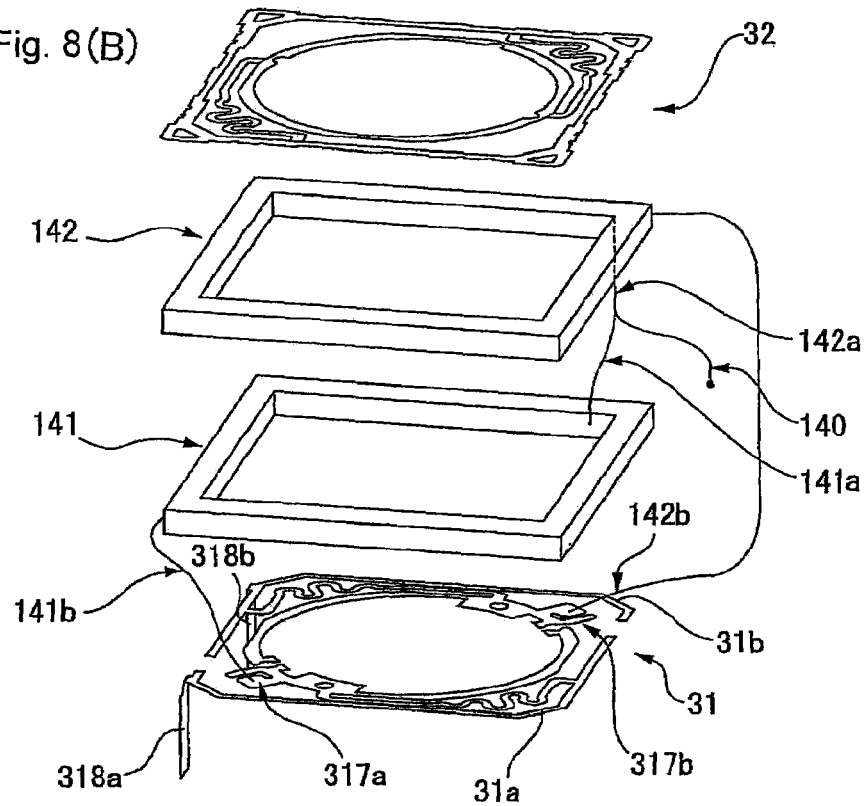

As shown in FIG. 8(B), while the ending winding (coil end portion) 141b pulled out from the outer periphery of the drive coil 141 may be soldered to the coil connecting portion 137a formed to the spring piece 31a, the ending winding (coil end portion) 142b pulled out from the outer periphery of the drive coil 142 may be soldered to the coil connecting portion 317b formed to the spring piece 31b. In this case, the beginning winding (coil end portion) 141a pulled out from the inner periphery of the drive coil 141 is connected with the beginning winding (coil end portion) 142a pulled out from the inner periphery of the drive coil 142. Even in this case, the ending winding (coil end portion) 142b of the drive coil 142 is passed through the groove-like guide portion 154 formed near the corner portion 157a of the sleeve 15 shown in FIG. 3(A) and guided to the spring piece 31b, and the connection portion 140 between the beginning winding (coil end portion) 141a of the drive coil 141 and the beginning winding (coil end portion) 142a of the drive coil 142 is also stored in the groove-like guide portion 154. In this way, the drive coils 141 and 142 are connected in series, but the winding directions of the drive coils 141 and 142 are opposite from each other.

Note that, when one of the coil end portions pulled out from the drive coils 141 and 142, which is pulled out at the position away from the first flat spring 31, is pulled around to the spring piece 31b, it may pass through the opening formed in the second flat spring 32.

(Detailed Configuration of Second Flat Spring 32)

Figure 9:
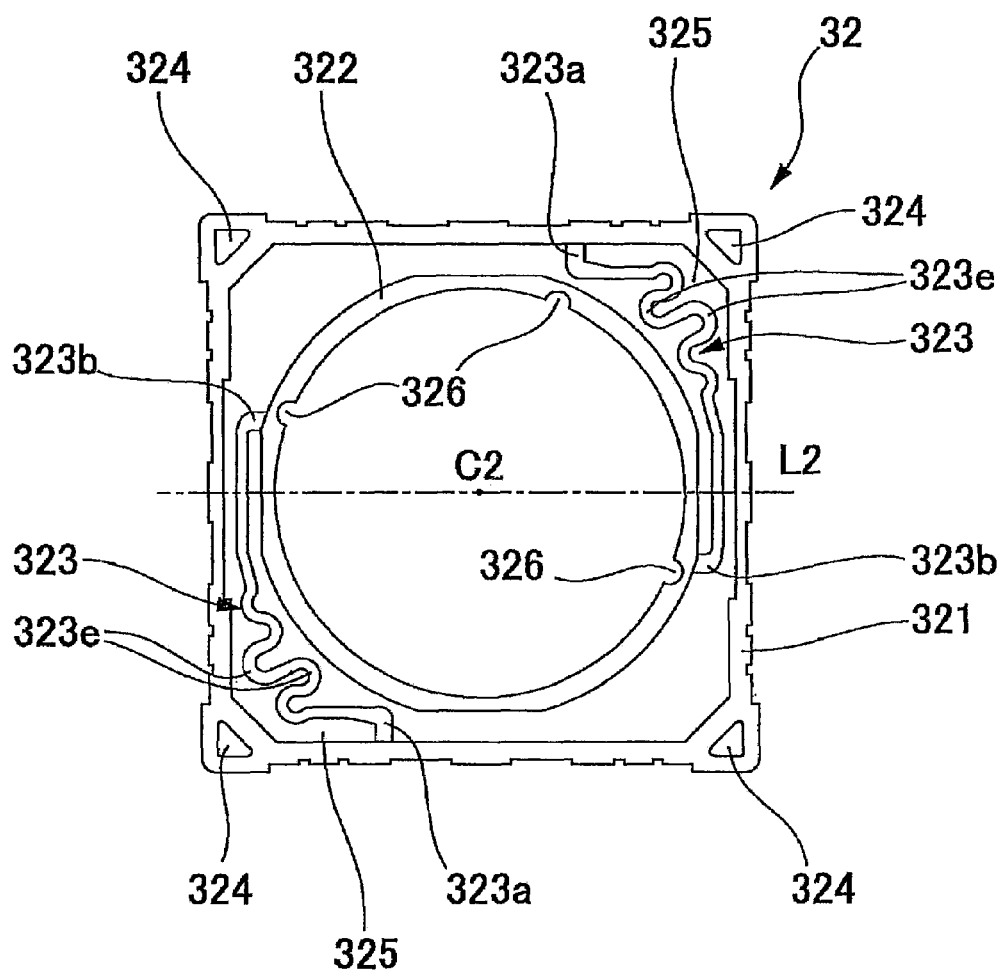
FIG. 9 is a plan view of the second flat spring used in the lens driving apparatus to which the present invention is applied.

FIG. 9 is a plan view of the second flat spring 32 used in the lens driving apparatus to which the present invention is applied. As shown in FIG. 9, the second flat spring 32 is provided with a rectangular outside frame portion 321 held by the fixed body 2 being sandwiched between the back yoke 16 and the case 11, an annular inside frame portion 322 joined to the top end of the sleeve 15, and two arm portions 323 for connecting the inside frame portion 322 and the outside frame portion 321. The two arm portions 323 are configured by point symmetry about the center C2 (optical axis) of the inside frame portion 322; each arm portion 323 extends in the area (hereinafter corner portion 325) corresponding to the corner portion of the outside frame portion 321 between the inside frame portion 322 and the outside frame portion 321, meandering in a plurality of curve portions 323e with respect to the direction of a plane perpendicular to the optical axis direction, L. The two arm portions 323 are configured such that the portions thereof joining with the outside frame portion 321 (outside frame joining portions 323a) are positioned on the sides of the outside frame portion 321 by point symmetry about the center C2 of the inside frame portion 322. Also, the two arm portions 323 respectively extend parallel to the side portions of the outside frame portion 321 to which they are joined, crossing over an imaginary bisector, L2, that passes through the center C2 (optical axis) of the inside frame portion 322, and then are joined to the inside frame portion 322.

In the two arm portions 323, the portions thereof joining with the inside frame portion 322 (inside frame joining portion 323b) are parallel to the bisector, L2, and are shifted from the bisector, L2 (preferably the inside frame joining portions 323b are respectively shifted to the opposite directions from the bisector, L2). Further, the extension lines of the inside frame joining portions 323b of the two arm portions 323 are displaced from the center, C2, of the inside frame portion 322. The arm portion 323 varies its width in the longitudinal direction, being wider near the outside frame joining portion 323a and at the inside frame joining portion 323b.

In each of the four corner portions of the outside frame portion 321 of the second flat spring 32, a hole 324 is formed into which the protrusion portion 16a of the back yoke 16 shown in FIG. 2(B) is fitted. Also, in the inside frame portion 322 of the second flat spring 32, notches 326 are cut into which small protrusions 152 of the sleeve 15 shown in FIG. 7(A) are fitted.

(Detailed Configuration of First Flat Spring 31)

Figure 10:
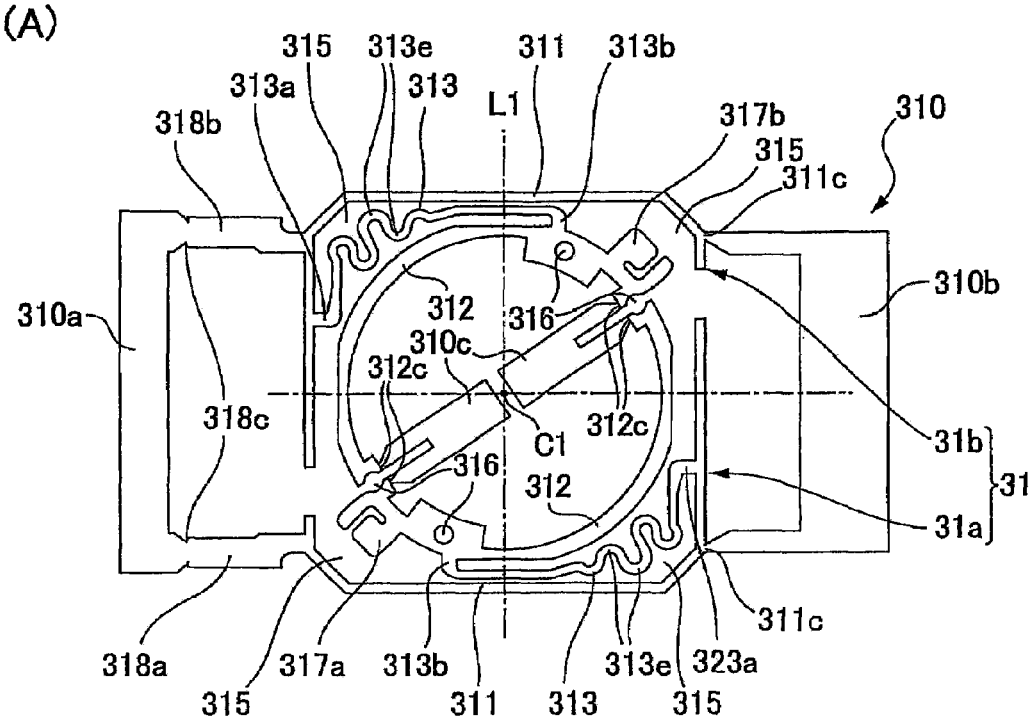
FIGS. 10(A) and (B) are respectively plan views of the configurations of the first flat spring used in the lens driving apparatus of the present invention before and after the division.
Figure 10:
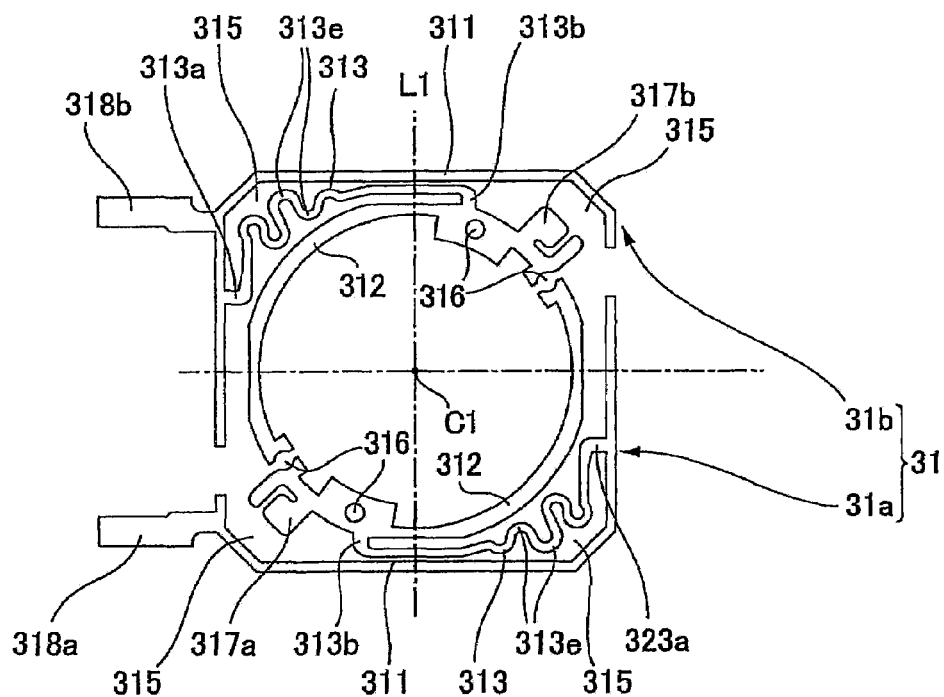

FIGS. 10(A) and (B) are plan views of the first flat spring 31 used in the lens driving apparatus to which the present invention is applied, showing the configuration before and after the division. As shown in FIG. 10(B), the first flat spring 31 is divided into two spring pieces 31a and 31b which are electrically insulated; when the spring pieces 31a and 31b are combined together, it is in the same shape as the second flat spring 32. More specifically described, the first flat spring 31 is provided with a rectangle outside frame portion 311 held by the fixed body 2 being sandwiched between the back yoke 16 and the base 19, an annular inside frame portion 312 joined to the bottom end of the sleeve 15, and two arm portions 313 for connecting the inside frame portion 312 and the outside frame portion 311. The two arm portions 313 are configured by point symmetry about the center, C1, (optical axis) of the inside frame portion 312; each of the arm portions 313 extends in the area (hereinafter corner portion 315) corresponding to the corner portion of the outside frame portion 311 created between the inside frame portion 312 and the outside frame portion 311, meandering in a plurality of curve portions 313e with respect to the direction of a plane perpendicular to the optical axis direction, L. The two arm portions 313 are configured such that the portions thereof joining with the outside frame portion 311 (outside frame joining portions 313a) are positioned on the sides of the outside frame portion 311 by point symmetry about the center, C1, of the inside frame portion 312. Also, each of the two arm portions 313 respectively extend parallel to the side portions of the outside frame portion 311, to which they are joined, crossing over an imaginary bisector, L1, that passes through the center, C1, (optical axis) of the inside frame portion 312, and then are joined to the inside frame portion 312.

In the two arm portions 313, the portions thereof joining with the inside frame portion 312 (inside frame joining portion 313b) are positioned on both sides of a bisector, L1, and extend parallel to the sides of the outside frame portion 311, that is, parallel to the bisector, L1; the extension lines of the inside frame joining portions 313b of the two arm portions 313 are displaced from the center, C1, of the inside frame portion 312. The arm portion 313 varies its width in the longitudinal direction, being wider near the outside frame joining portion 313a and at the inside frame joining portion 313b.

In the inside frame portion 312 of the first flat spring 31, small holes 316 are formed to which the small protrusions 151 of the sleeve 15 shown in FIG. 7(B) are fitted. Also, in the first flat spring 31, coil connection portions 317a and 317b are formed in the inside frame portions 312 of the spring pieces 31a and 31b, projecting toward the outer periphery, and are connected by soldering to the coil ends shown in FIGS. 8(A) and (B). Further, in the first flat spring 31, terminals 318a and 318b are respectively formed at the outside frame portions 311 of the spring pieces 31a and 31b, being bent at right angle at the outer periphery.

The first flat spring 31 configured as above is assembled in the lens driving apparatus 10 as a flat spring-configuring member 310 in which the spring pieces 31a and 32b are formed in a lead frame as a single unit. In the flat spring-configuring member 310, the ends of the terminals 318a and 318b are joined to a substantially U-shaped connection portion 310a via constricted portions 138c. Therefore, by simply folding [the connection portion 310a] at the constricted portions 318c, the connection portion 310a can be cut. Also, on the other side of the first flat spring member from the terminals 318a and 318b, the outside frame portion 311 is joined to the substantially U-shaped connection portion 310b via constricted portions 311c. Therefore, by simply folding [the connection portion 310b] at the constricted portions 311c, the connection portion 310b can be cut. Further, the ends of the inside frame portions 312 are respectively joined via constricted portions 312c with two pieces of connection portions 310c that extend inward in the radial direction. One end of each of the two pieces of connection portions 310c is divided by a slit; by simply folding the pieces of connection portions 310c individually at the constricted portions 312c, the connection portions 310c can be detached. For this reason, the end portions of the spring pieces 31a and 32b have a cutting [trace].

(Assembly Method)

The lens driving apparatus 10 using the above members is assembled in the following process. The movable body 3 is first positioned inside the back yoke 16, and the back yoke 16 and the base 19 are fixed by an adhesive, sandwiching the flat spring member configuring unit 310 (first flat spring 31) and an insulation material (not illustrated) between them. Next, the connection portions 310a, 310b and 310c are respectively folded at the constricted portions 311c, 312c and 318c of the flat spring member configuring unit 310 to detach them. In this manner, the first flat spring 31 is divided into two pieces of spring pieces 31a and 31b. Then, the terminals 318a and 318b are bent downward.

Next, the coil ends of the drive coils 141 and 142 are soldered to the coil connection portions 317a and 317b formed to the spring pieces 31a and 31b. Note that the process of soldering the coil ends of the drive coils 141 and 142 to the coil connection portions 317a and 317b may be performed before the flat spring member configuring unit 310 is divided into the spring pieces 31a and 31b.

For such an assembly process, in the movable body 3 (sleeve 15), the ball-type, wire-type or bar-type magnetic piece 138 is attached to each of the magnetic piece retaining holes 159a, 159b, 159c and 159d, which open to the photographic subject side, and fixed by an adhesive.

Next, the back yoke 16 and the case 11 are fixed by an adhesive, sandwiching the second flat spring 32 and an insulation material (not illustrated) between them. At that time, the corner portions 157a and 157c including the magnetic piece retaining holes 159a and 159c are entirely covered by the case 11. On the other hand, the magnetic piece retaining holes 159b and 159d are exposed with the faces thereof on the photographic subject side through the notch portions of the flat spring 32 and the notches 112b and 112d of the case 11.

Under this condition, the drive coils 141 and 142 are electrified to drive the movable body 3, and then the inclination of the movable body 3 and the current value (start current) required to start the movable body 3 are corrected. In other words, if there is a problem in the inclination of the movable body 3, an additional ball-type, wire-type, or bar-type magnetic piece 138 is attached to either one or both of the magnetic piece retaining holes 159b and 159d or the magnetic piece 138 is replaced with one in a different size to correct the inclination of the movable body 3. Also, by placing the additional magnetic piece 138 or replacing the magnetic piece 138 with one in a different size, the current value (starting current) required to start the movable body 3 can be adjusted. Without such a configuration, the magnetic pieces 138 once installed in the lens driving apparatus 10 cannot be replaced with another; when the urging force of the magnetic pieces 138 applied to the moving body 3 is not suitable, waste of process can be prevented. However, according to this embodiment, even after the inspection of the apparatus near the completion of the assembly, the magnetic pieces 138 can be easily changed; therefore, there will be no waste of process.

Next, the plate-like cover 18 is layered on the end of the case 11 on the photographic subject side, and the engaging protrusions 191 of the base 19 are fitted into the engaging through holes 181a to fix the plate-like cover 18 to the base 19. Under this condition, the entire corner portions 157b and 157d of the sleeve 15 including the magnetic piece retaining holes 159b and 159d and also the entire notches 112b and 112d of the case 11 are covered by the plate-like cover 18.

Figure 11:
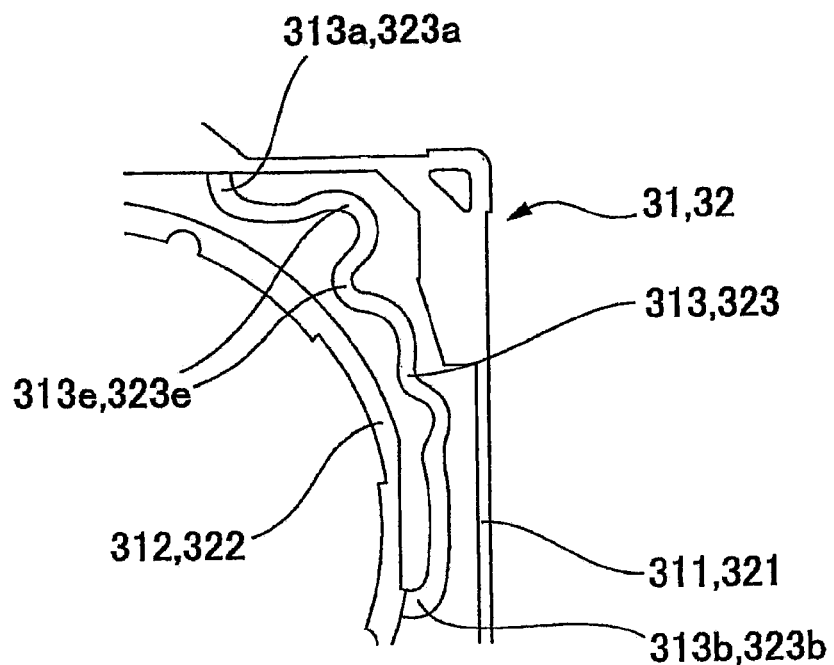
FIGS. 11(A) and (B) are respectively enlarged diagrams showing the shape of the meander portion of the flat spring used in the lens driving apparatus to which the present invention is applied.
Figure 11:
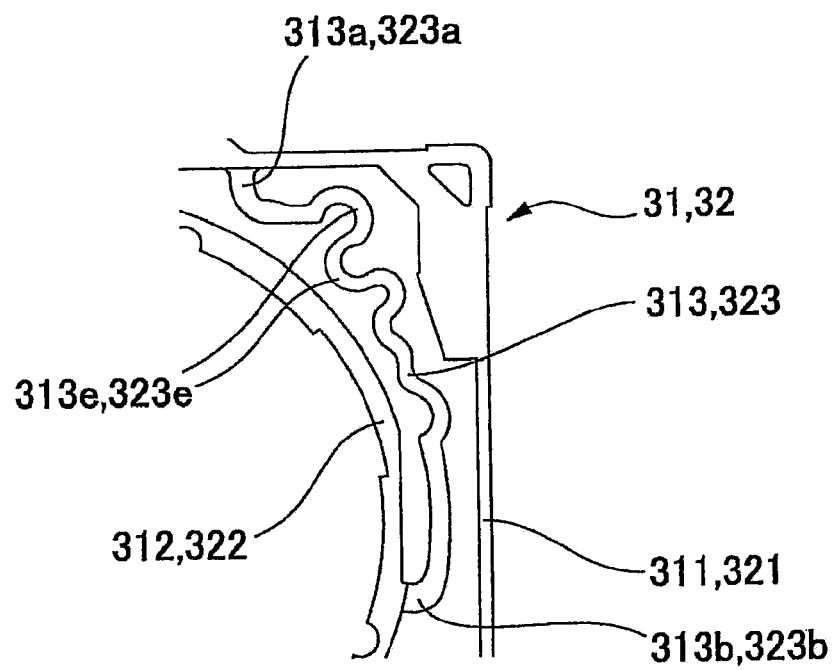

FIGS. 11(A) and (B) are respectively the enlargements of the examples of the shape of the meander portion of the flat spring used in the lens driving apparatus of the present invention. As shown in FIGS. 11(A) and (B), the meander portion of the flat spring 31, 32 formed with a plurality of curve portions 313e, 323e can be formed in any shape within the scope of the present invention. For example, as shown in FIG. 11(A), the meander portion can be shaped by stretching the meandering line; as shown in FIG. 11(B), it can be shaped with more turns.

Figure 12A:
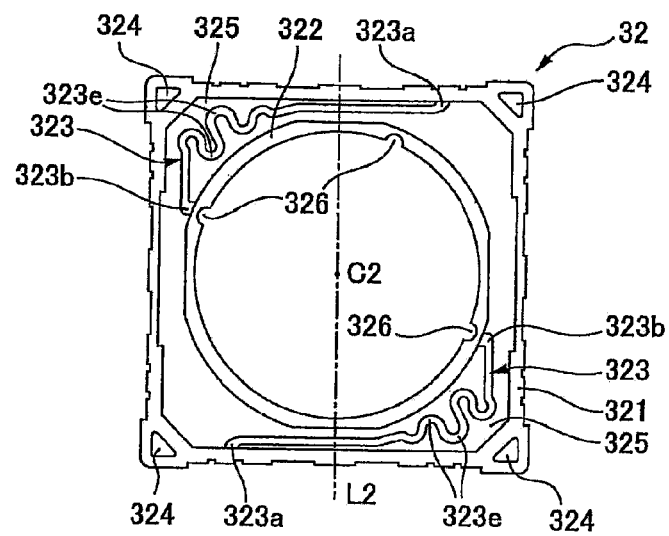
FIGS. 12(A), (B) and (C) are respectively configuration diagrams showing the shape of the arm portion of the flat spring used in the lens driving apparatus to which the present invention is applied.
Figure 12B:
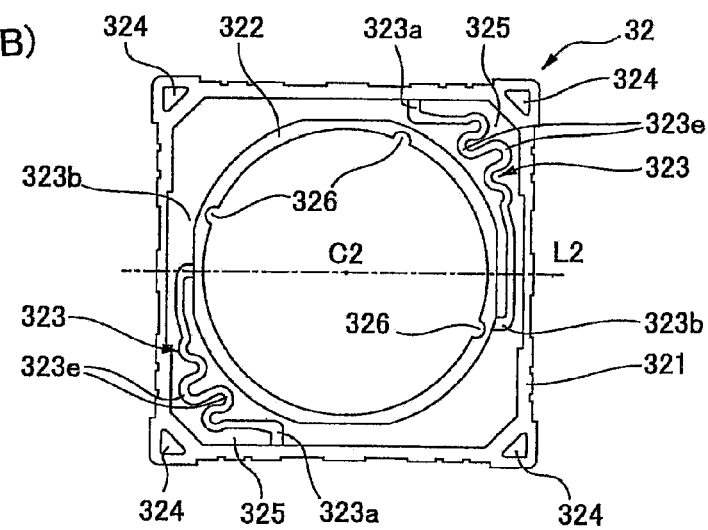
Figure 12C:
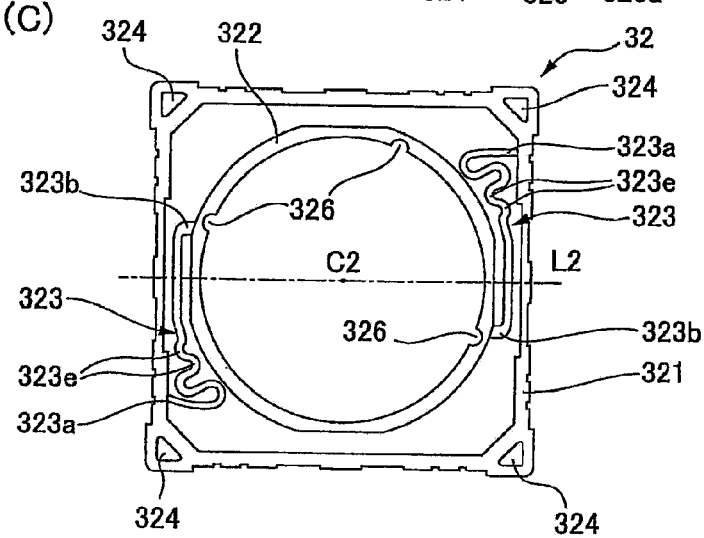

FIGS. 12(A), (B) and (C) are respectively configuration diagrams showing the examples of the shape of the arm portions of the flat spring in the present invention. As shown in FIGS. 12(A), (B) and (C), in the flat spring 32, the two arm portions 323 can be formed in any shape within the scope of the present invention. For example, in the above-mentioned embodiment, the meander portion is formed closer to the outside frame joining portion 323a; however, as shown in FIG. 12(A), the meander portion may be formed closer to the inside frame joining portion 323b. Also, as shown in FIG. 12(B), one of the extension lines of the inside frame joining portions 323b may pass through the center position, C, of the inside frame portion 322 while the other extension line extends away from the center position, C. Further, as shown in FIG. 12(C), if the extension lines of the inside frame joining portions 323b extend parallel to each other on both sides of the center position, C, of the inside frame portion 322, one of the extension lines of the outside frame joining portion 323a may be parallel to the extension lines of the inside frame joining portion 323b and the other may intersect with the extension lines of the inside frame joining portion at any angle but 90 degrees. Although the illustration is omitted, both extension lines of the outside frame joining portion 323a may be parallel to the extension lines of the inside frame joining portion 323b or may intersect with the extension lines of the inside frame joining portion 323b at any angle but 90 degrees. Note that the configurations described referring to FIGS. 12(A), (B) and (C) can be applied to the arm portion 313 of the flat spring 31.

(Effects of Shock Resistance)

As described in this embodiment, even when the rectangular flat springs 31 and 32 are used in accordance with the external shape of the lens driving apparatus 10 or the shape of the lens driving apparatus 5, wider space assigned to the corner portions 315 and 325 in the outside frame portions 311 and 321 created in the area sandwiched between the rectangular outside frame portion 311 and the annular inside frame portions 312 and 322, is efficiently used to extend the arm portions 313 and 323. For this reason, a sufficient spring property can be given to the arm portions 313 and 323, and the arm portions 313 and 323 can be constructed in such way that plastic deformation and breaking are not easily caused when the movable body 3 is moved abruptly in the direction perpendicular to the optical axis direction, L, or in the tilt direction. In other words, the arm portions 313 and 323 are shaped to have a plurality of curve portions 313e and 323e in wider space corresponding to the corner portions 315 and 325 of the outside frame portion 311 created in the area sandwiched between the outside frame portions 311 and 321 and the inside frame portions 312 and 322. Therefore, even when the flat springs 31 and 32 are deformed by external force, since the stress applied to the meander portions is decentralized, the strength of the flat springs 31 and 32 remains. Accordingly, even when a vibration or shock in the direction perpendicular to the optical axis direction of the movable body 3 or in the tilt direction is applied to the apparatus having the configuration that the flat springs 31 and 32 have the rectangular outside frame portions 311 and 321, the flat springs 31 and 32 will not have plastic deformation or breaking. Therefore, the lens driving apparatus 10 can be configured to be excellent in resisting vibrations and shocks in the direction perpendicular to the optical axis direction and in the tilt direction and also excellent in resisting the twist (distortion?) of the movable body 3.

Also, the inside frame joining portions 313b and 323b which are joined to the inside frame portion 312 and 322 in the two arm portions 313 and 323 are configured such that the extension lines thereof extend parallel to each other in both areas sandwiching the center position, C, of the inside frame portions 312 and 322. Therefore, since the locations at which the arm portions 313 and 323 give the spring property to the movable body 3 can be decentralized in a plane perpendicular to the optical axis direction, L, vibrations of the movable body 3 in the tilt direction can be efficiently reduced. From such a viewpoint, the extension lines of the inside frame joining portion 313b and 323b may intersect with each other at the position avoiding the center positions, C1 and C2, of the inside frame portions 312 and 322.

Further, the two arm portions 313 and 323 respectively extend crossing imaginary bisectors, L1 and L2, which pass through the centers of the inside frame portions 312 and 322, and the arm portions 313 and 323 are formed long; therefore, even when there is a restriction such as a narrow space between the sides of the outside frame portions 311 and 321 and the inside frame portions 312 and 322, the spring property can be enhanced.

The two flat springs 31 and 32 are formed in the same shape, but arranged so that the angle position is shifted by 90°; therefore, the movable body 3 can be supported by the spring property in all directions. For this reason, problems such as poor vibration resistance and shock resistance in a particular direction can be avoided. Considering the fact that the movable body 3 is supported by the spring property in all directions, the shift of angle positions of the two flat springs 31 and 32 is not limited to 90° depending on the number and shape of the arm portions 313 and 323.

Also, the arm portions 313 and 323 are formed wider near the outside frame joining portion 313a and at the inside frame joining portion 313b, thus varying the width thereof in the longitudinal direction; therefore, problems will be avoided in that the movable body 3 is resonated and displaced greatly and stress is concentrated on specific locations of the arm portions 313 and 323. From the above viewpoint, the thickness of the arm portions 313 and 323 may be changed in the longitudinal direction.

Major Effects of this Embodiment

As described above, in this embodiment, the first flat spring 31 is divided at one place in the optical axis direction, L, into a plurality of spring pieces 31a and 31b, and these spring pieces 31a and 31b are used for current supply to the drive coils 141 and 142; therefore, current can be supplied to the drive coils 141 and 142 by simply supplying current at one place in the optical axis direction, L. Thus, there is no need to supply current at two locations which are distanced from each other in the optical axis direction, L, and also no need to pull around one of the terminals to the vicinity of the other; thus, current can be easily supplied to the coils provided to the movable body.

Also, since the spring pieces 31a and 31b of the first flat spring 31 positioned opposite from the photographic subject side are used for current supply in this embodiment, the space for wiring can be reduced. In other words, since other electrical wiring such as the arrangement of the image pick-up device is done on the side opposite from the photographic subject side, the wiring may be gathered on the side opposite from the photographic subject side to reduce the wiring space and increase efficiency of the wiring operation.

Further, in this embodiment, the terminals 318a and 318b are integrally formed to the spring pieces 31a and 31b for external power supply. Therefore, there is an advantage in that there is no need to provide an additional terminal.

Other Embodiment

In the above embodiment, the first flat spring 31 and the second flat spring 32 are composed of the same material; however, they may be composed of different materials. More specifically described, the first flat spring 31 which is divided into the spring pieces 31a and 31b may be formed of a hard material that facilitates folding and cutting or a material excellent in conductivity while the second flat spring 32 which is not divided into pieces may be composed of a material excellent in resilience for the spring property.

In the above embodiment, the first flat spring 31 is divided into the two spring pieces 31a and 31b; however, it may be divided into three or more pieces and the connection portion 140 between the first drive coil 141 and the second drive coil 142 may be electrically connected to another spring piece different from the one to which the coil end portion is connected.

Further, one of a plurality of spring pieces may be electrically connected to the back yoke 16 and a ground potential be applied to the back yoke 16 via the spring piece to configure a shield structure.

Furthermore, in the above embodiment, the first flat spring 31 is completely divided into the two spring pieces 31a and 31b; however, the spring pieces may be joined together by resin as long as they are separated electrically.

Also, the second flat spring 32 positioned on the photographic subject side may be divided into a plurality of spring pieces. Further, the terminals and the spring pieces may be formed separately and then the terminals may be attached to the spring pieces later or electrically connected by using another wiring material. To facilitate the folding of the flat spring member configuring unit 310 for cutting off, thin portions formed by half etching may be used in addition to the constricted portions.

Note that, although the drive magnet 17 is divided in the above embodiment, a single drive magnet 17 may be used. In the above embodiment, two drive coils are used; however, one drive coil may be used. On the other hand, one drive coil and two drive magnets may be used. Further, in the above embodiment, the drive magnets 17 and the drive coils 141 and 142 are opposed to each other in the optical axis direction, L; however, the drive coils 141 and 142 may be fixed to the outer periphery of the sleeve 15 and the drive magnets 17 may be fixed to the back yoke 16 so that they are opposed to the outer periphery of the drive coils 141 and 142. Further, if an interlinked magnetic field can be produced to the drive coils 141 and 142 in the direction perpendicular to the optical axis, the drive magnets 17 can be magnetized in the axial line direction or magnetized on the inside and outside thereof in the radial direction. Also, to the sleeve 15, the drive magnets, not the drive coils, can be fixed. In the above embodiment, the plate-like cover 18 may be composed of a magnetic material, and the entire side faces of the case 11, the back yoke 16 and the base 19 may be covered by the plate-like cover 18. In this way, the plate-like cover 18 can function as a shield material. Also, the portion of the plate-like cover 18 that covers the side face of the back yoke 16 may be formed of a magnetic material. In this way, the plate-like cover 18 can function as a supplement back yoke for intensifying the magnetism of the drive magnets 17. In the above embodiment, the protrusions are formed to the movable body 3 and the recess portions are cut to the fixed body 2 to [together] create the stopper mechanism 101 (the first stopper mechanism); however, recess portions which are recessed inward in the radial direction may be formed to the movable body 3 and protrusions which come into the recess portions may be formed to the fixed body to [together] create the stopper mechanism 101 (the first stopper mechanism). Furthermore, although the four magnetic piece retaining holes are provided to the movable body 3, only one magnetic piece retaining hole may be provided.

DESCRIPTION OF REFERENCES NUMERALS

2 Fixed body
3 Movable body
10 Lens driving apparatus
15 Sleeve
2 Flat spring (spring member)
31a, 31b Spring piece
141, 142 Drive coil
311, 321 Outside frame portion
312, 322 Inside frame portion
313, 323 Arm portion While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens driving apparatus comprising:
   a movable body holding lenses;
   a fixed body for supporting said movable body via a spring member to move in the optical axis direction; and
   a magnetic drive mechanism which has coils held by said movable body and which drives said movable body in the optical axis direction;
   wherein said spring member is configured with a plurality of spring pieces which are electrically divided at one location in the optical axis direction, and a plurality of coil end portions pulled out from said coils are respectively and electrically connected to different spring pieces of a plurality of said spring pieces from each other;
   wherein one of said coil end portions pulled out from said coils, which is pulled out at the position away from said spring piece, is passed through a groove-like guide portion extending in the optical axis direction on the outer peripheral face of said movable body and pulled around to said spring piece.

2. The lens driving apparatus as set forth in claim 1 wherein said spring member is configured with a first spring member and a second spring member positioned at two places distanced from each other in the optical axis direction, and either said first spring member or said second spring member is divided into a plurality of said spring pieces.

3. The lens driving apparatus as set forth in claim 2 wherein the other spring member, said first spring member or said second spring member which is not divided into pieces, has openings formed for said coil end portions pulled out from said coils to pass at the positions away from said spring pieces.

4. The lens driving apparatus as set forth in claim 2 wherein said second spring member is arranged on the photographic subject side and said first spring member is arranged opposite from said photographic subject side; and said first spring member is divided into a plurality of said spring pieces.

5. The lens driving apparatus as set forth in claim 2 wherein said first spring member and said second spring member are composed of different materials.

6. The lens driving apparatus as set forth in claim 1 wherein terminals for external power supply are formed integrally with said spring pieces.

7. The lens driving apparatus as set forth in claim 1 wherein said coils are configured with first coil and second coil positioned at two places distanced from each other in the optical axis direction; said first coil and said second coil are connected with each other by coil end portions thereof on one ends, and coil end portions on the other ends are electrically connected to said spring piece.

8. The lens driving apparatus as set forth in claim 7 wherein the connection portion of said coil end portions on one ends are electrically connected to the other spring piece different from the one connected to said coil end portions on the other end.

9. The lens driving apparatus as set forth in claim 1 wherein a plurality of said spring pieces include a spring piece that is electrically connected to a back yoke constituting said magnetic drive mechanism; a ground potential is applied to said spring piece.

10. The lens driving apparatus as set forth in claim 1 wherein the end portions of a plurality of said spring pieces have a cutting trace.

11. A method of manufacturing a lens driving apparatus which comprises a movable body holding lenses, a fixed body for supporting said movable body via a spring member to move in the optical axis direction, and a magnetic drive mechanism which is provided with coils held by said movable body and drives said movable body in the optical axis direction; the method comprising:

joining a spring member configuring unit as a single unit to said movable body;

dividing said spring member configuring unit into spring pieces to which a plurality of coil end portions pulled out from said coils are respectively connected, and said spring member is configured by a plurality of said spring pieces;

wherein one of said coil end portions pulled out from said coils, which is pulled out at the position away from said spring piece, is passed through a groove-like guide portion extending in the optical axis direction on the outer peripheral face of said movable body and pulled around to said spring piece.

12. The method of claim 11 wherein said spring member configuring unit is configured such that a plurality of spring pieces are joined together via constricted portions or thin portions.

* * * * *